(12) United States Patent
Arkhangorodsky et al.

(10) Patent No.: US 11,715,475 B2
(45) Date of Patent: Aug. 1, 2023

(54) METHOD AND SYSTEM FOR EVALUATING AND IMPROVING LIVE TRANSLATION CAPTIONING SYSTEMS

(71) Applicant: Beijing DiDi Infinity Technology and Development Co., Ltd., Beijing (CN)

(72) Inventors: Arkady Arkhangorodsky, Los Angeles, CA (US); Christopher Chu, Los Angeles, CA (US); Scot Fang, Los Angeles, CA (US); Denglin Jiang, Los Angeles, CA (US); Yiqi Huang, Los Angeles, CA (US); Ajay Nagesh, Los Angeles, CA (US); Boliang Zhang, Los Angeles, CA (US); Kevin Knight, Los Angeles, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 73 days.

(21) Appl. No.: 17/479,349

(22) Filed: Sep. 20, 2021

(65) Prior Publication Data
US 2023/0089902 A1    Mar. 23, 2023

(51) Int. Cl.
*G06F 40/00* (2020.01)
*G10L 15/32* (2013.01)
(Continued)

(52) U.S. Cl.
CPC ............ *G10L 15/32* (2013.01); *G06F 40/49* (2020.01); *G06F 40/51* (2020.01); *G06F 40/58* (2020.01);
(Continued)

(58) Field of Classification Search
CPC ....... G10L 15/32; G10L 15/063; G10L 15/08; G10L 25/27; G10L 2015/088;
(Continued)

(56) References Cited

U.S. PATENT DOCUMENTS

| 10,108,610 B1* | 10/2018 | Pierard | .................. G06F 40/58 |
| 2010/0283829 A1* | 11/2010 | De Beer | ................. H04M 3/56 |
| | | | 348/14.09 |

(Continued)

OTHER PUBLICATIONS

John Chamberlain, Karen Fort, Ugo Kruschwitz, Mathieu Lafourcade, Massimo Poesio. Using Games to Create Language Resources: Successes and Limitations of the Approach. Gurevych, Iryna and Kim, Jungi. Theory and Applications of Natural Language Processing, Springer, pp. 42, 2013, 978-3-642-35084-9. (Year: 2013).*

(Continued)

*Primary Examiner* — Jesse S Pullias
*Assistant Examiner* — Parker Mayfield
(74) *Attorney, Agent, or Firm* — Sheppard Mullin Richter & Hampton LLP (57) ABSTRACT

Methods, systems, and apparatus, including computer programs encoded on computer storage media for evaluating and improving live translation captioning systems. An exemplary method includes: displaying a word in a first language; receiving a first audio sequence, the first audio sequence comprising a verbal description of the word; generating a first translated text in a second language; displaying the first translated text; receiving a second audio sequence, the second audio sequence comprising a guessed word based on the first translated text; generating a second translated text in the first language; determining a matching score between the word and the second translated text; determining a performance score of the live translation captioning system based on the matching score.

15 Claims, 7 Drawing Sheets

(51) Int. Cl.
 *G10L 15/08* (2006.01)
 *G10L 15/06* (2013.01)
 *G06F 40/49* (2020.01)
 *G06F 40/51* (2020.01)
 *G06F 40/58* (2020.01)
 *G10L 25/27* (2013.01)

(52) U.S. Cl.
 CPC ............ *G10L 15/063* (2013.01); *G10L 15/08* (2013.01); *G10L 25/27* (2013.01); *G10L 2015/088* (2013.01)

(58) Field of Classification Search
 CPC .......... G06F 40/49; G06F 40/51; G06F 40/58; G06K 9/3266; G06V 20/635; G06V 20/40
 See application file for complete search history.

(56) References Cited

U.S. PATENT DOCUMENTS

| | | | | |
|---|---|---|---|---|
| 2011/0246172 | A1* | 10/2011 | Liberman | H04M 3/56 348/14.09 |
| 2018/0357224 | A1* | 12/2018 | Yamauchi | G06F 40/51 |

OTHER PUBLICATIONS

Naveen Arivazhagan et al., Re-Translation Strategies for Long Form, Simultaneous, Spoken Language Translation In Proc. ICASSP, 2020.
Fanfang Chen et al., DiDi's Machine translation system for WMT2020. In Proc. WMT, 2020.
Eunah Cho et al., "A Real-World System for Simultaneous Translation of German Lectures", In Interspeech, 2013.
Kyunghyun Cho et al., "Can Neural Machine Translation Do Simultaneous Translation?" arXiv:1606.02012v1 [cs.CL], Jun. 7, 2016.
Jiatao Gu et al., "Learning to Translate in Real-Time with Neural Machine Translation", In Proc. EACL, 2017.
Liang Huang et al., "Simultaneous Translation", In Proc. EMNLP: Tutorial Abstracts, 2020.
Mingbo Ma et al., "STACL: Simultaneous Translation with Implicit Anticipation and Controllable Latency Using Prefix-to-Prefix Framework", In Proc. ACL, 2019.
Jan Niehues et al., "Dynamic Transcription for Low-Latency Speech Translation", In Inter-Speech, 2016.
Jan Niehues et al., "Low-Latency Neural Speech Translation", In Interspeech, 2018.
Kishore Papineni et al., "Bleu: A Method for Automatic Evaluation of Machine Translation", Proceedings of the 40th Annual Meeting of the Association for Computational Linguistics (ACL), Philadelphia, Jul. 2002, pp. 311-318.
Tae Jin Park et al., "A Review of Speaker Diarization: Recent Advances with Deep Learning", arXiv:2101.09624v2, Jun. 21, 2021.
Colin Raffel et al., "Online and Linear-Time Attention by Enforcing Monotonic Alignments", Proceedings of the 34th International Conference on Machine Learning, Sydney, Australia, PMLR 70, 2017.
Sunit Sivasankaran et al., "Phone Merging for Code-Switched Speech Recognition", In Workshop on Computational Approaches to Linguistic Code Switching, Jul. 2018.
Thamar Solorio et al., "Learning to Predict Code-Switching Points", Proceedings of the 2008 Conference on Empirical Methods in Natural Language Processing, Honolulu, Oct. 2008, pp. 973-981.
Xiaolin Wang et al., "A prototype automatic simultaneous interpretation system", In Proc. Coling: System Demonstrations, 2016.
Hua Wu et al., editors "Proceedings of the Second Workshop on Automatic Simultaneous Translation", Jun. 10, 2021.
Hua Wu et al., editors "Proceedings of the First Workshop on Automatic Simultaneous Translation", Jul. 10, 2020.
ZDNet. 2021. Cisco's Webex Debuts Real-Time Translation from English to 100+ Languages. https://zdnet/article/ciscos-webex-debuts-free-real-time-translation-from-english-to-100-languages.com, Mar. 2, 2021.
Baigong Zheng et al., "Simultaneous Translation with Flexible Policy via Restricted Imitation Learning", Proceedings of the 57th Annual Meeting of the Association for Computational Linguistics, Florence, Italy, Jul. 28-Aug. 2, 2019, pp. 5816-5822.

* cited by examiner

600 feeding a received audio clip into a language classifier trained based on a plurality of labeled training audio clips in a plurality of languages — 610 obtaining a plurality of confidence scores generated by the language classifier in classifying a language spoken in the received audio clip, wherein the plurality of confidence scores respectively correspond to the plurality of languages — 620 feeding the received audio clip into an Automatic Speech Recognition (ASR) model corresponding to a first language to obtain text output in the first language, wherein the ASR model has been used for transcribing previous audio clips into texts in the first language — 630 determining a conversion quality score of the text output — 640 determining whether the language spoken in the received audio clip has changed to a second language based on the conversion quality score and the plurality of confidence scores — 650

METHOD AND SYSTEM FOR EVALUATING AND IMPROVING LIVE TRANSLATION CAPTIONING SYSTEMS

TECHNICAL FIELD

The disclosure relates generally to systems and methods for evaluating and improving the performance of live translation captioning systems.

BACKGROUND

As collaborations across countries are the norm in the modern workplace, videoconferencing has become an indispensable part of our working lives. The recent widespread adoption of remote work has necessitated effective online communication systems, especially among people who speak different languages. These systems aim to facilitate conversation between people who speak different languages, thereby reducing communication barriers between multilingual participants. Lack of end-to-end performance evaluation of these systems has proven to be detrimental to the service providers who have to juggle subjective user expectations. Comprehensive performance evaluation uncovers the pain points of the user experience in using the systems and allows the service providers to automate critical features.

SUMMARY

Various embodiments of the specification include, but are not limited to, systems, methods, and non-transitory computer-readable media for measuring and improving the performance of a live translation captioning system.

In various implementations, a first exemplary method for evaluating performance of a live translation captioning system may include: displaying a word in a first language on a first user interface; receiving a first audio sequence, the first audio sequence comprising a verbal description of the word in the first language; generating a first translated text in a second language by feeding the first audio sequence into a pipeline comprising an Automatic Speech Recognition (ASR) subsystem and a machine translation (MT) subsystem; displaying the first translated text on a second user interface; receiving a second audio sequence, the second audio sequence comprising a guessed word based on the first translated text; generating a second translated text in the first language by feeding the second audio sequence into the pipeline; determining a matching score between the word and the second translated text; determining a performance score of the live translation captioning system based on the matching score.

In some embodiments, the generating the first translated text comprises: generating a first text sequence by feeding the first audio sequence into the ASR subsystem; and generating the first translated text in the second language by feeding the first text sequence into the MT subsystem corresponding to the second language.

In some embodiments, the first audio sequence comprises a plurality of audio segments, and the ASR subsystem is configured to generate an output when each of the plurality of audio segments is fed in.

In some embodiments, the feeding the first text sequence into the MT subsystem comprises: feeding every k-th output generated by the ASR subsystem into the MT subsystem, wherein k is a positive integer.

In some embodiments, the feeding the first text sequence into the MT subsystem comprises: feeding the output generated by the ASR subsystem into the MT subsystem if t seconds have elapsed since a most recent output of the ASR subsystem was fed into the MT subsystem, wherein t is a positive integer.

In some embodiments, the generating the second translated text comprises: generating a second text sequence by feeding the second audio sequence into the ASR subsystem; and generating the second translated text by feeding the second text sequence into the MT subsystem.

In some embodiments, the ASR subsystem comprises a sequence-to-sequence ASR model trained based on a joint set of corpora from a plurality of languages.

In some embodiments, the ASR subsystem comprises a plurality of ASR models respectively trained based on training samples from a plurality of languages.

In some embodiments, the MT subsystem comprises a multilingual neural machine translation model trained based on a joint set of corpora from a plurality of languages.

In some embodiments, the MT subsystem comprises a plurality of MT models respectively trained based on training samples from a plurality of languages.

In some embodiments, the method further comprises selecting the word from a plurality of word candidates in a first language based on ambiguity scores of the plurality of word candidates, wherein the ambiguity scores of the plurality of word candidates are determined by: feeding each of the plurality of word candidates into an online dictionary to obtain returned entries; and determining an ambiguity score of the word based on a number of returned entries.

In some embodiments, the receiving the first audio sequence comprises continuously receiving audio signals, and the generating the first translated text in the second language comprises streaming the continuous audio signals into the pipeline and obtaining a stream of translated phrases in the second language.

In some embodiments, the displaying the first translated text on the second user interface comprises a live captioning of the stream of translated phrases.

In some embodiments, the determining a performance score of the live translation captioning system based on the matching score comprises: in response to the matching score being greater than a threshold, increasing a performance score of the live translation captioning system, wherein the increase is inversely proportional to a time spent between generating the first translated text and generating the second translated text.

According to another aspect, a second exemplary method for automatically switching language in a live translation captioning system may include: feeding a received audio clip into a language classifier trained based on a plurality of labeled training audio clips in a plurality of languages; obtaining a plurality of confidence scores generated by the language classifier in classifying a language spoken in the received audio clip, wherein the plurality of confidence scores respectively correspond to the plurality of languages; feeding the received audio clip into an Automatic Speech Recognition (ASR) model corresponding to a first language to obtain text output in the first language, wherein the ASR model has been used for transcribing previous audio clips into texts in the first language; determining a conversion quality score of the text output; determining whether the language spoken in the received audio clip has changed to a second language based on the conversion quality score and the plurality of confidence scores.

In some embodiments, the determining the conversion quality score of the text output comprises: determining the conversion quality score by using a Bidirectional Encoder Representations from Transformer (BERT).

In some embodiments, determining whether the language spoken in the received audio clip has changed to the second language comprises: if the conversion quality score of the text output is below a threshold: identifying the second language corresponding to a highest confidence score from the plurality of confidence scores; and determining the language spoken in the received audio clip has changed to the second language.

In some embodiments, the method may further comprise displaying a prompt window for a user to confirm whether the language spoken in the received audio clip has changed to the second language; in response to the user confirming of language change, disabling the ASR model corresponding to the first language and enabling an ASR model corresponding to the second language for transcribing new audio clips.

In some embodiments, the method may further comprise, in response to determining that the language spoken in the received audio clip has changed to the second language, disabling the ASR model corresponding to the first language and enabling an ASR model corresponding to the second language for transcribing the received audio clip.

According to other embodiments, a computing system may comprise one or more processors and one or more non-transitory computer-readable memories coupled to the one or more processors and configured with instructions executable by the one or more processors. Executing the instructions may cause the system to perform any of the exemplary methods of any of the preceding embodiments.

According to yet other embodiments, a non-transitory computer-readable storage medium is configured with instructions executable by one or more processors to cause the one or more processors to perform any of the exemplary methods of any of the preceding embodiments.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

The present disclosure describes an end-to-end performance evaluation suite to measure the performance of video conferencing systems with live translation captions when the participants speak different languages. With the discoveries of using the end-to-end performance evaluation suite, the disclosure further describes an automatic language identification feature for the video conferencing systems to provide a seamless transition between translating different languages.

Figure 1:
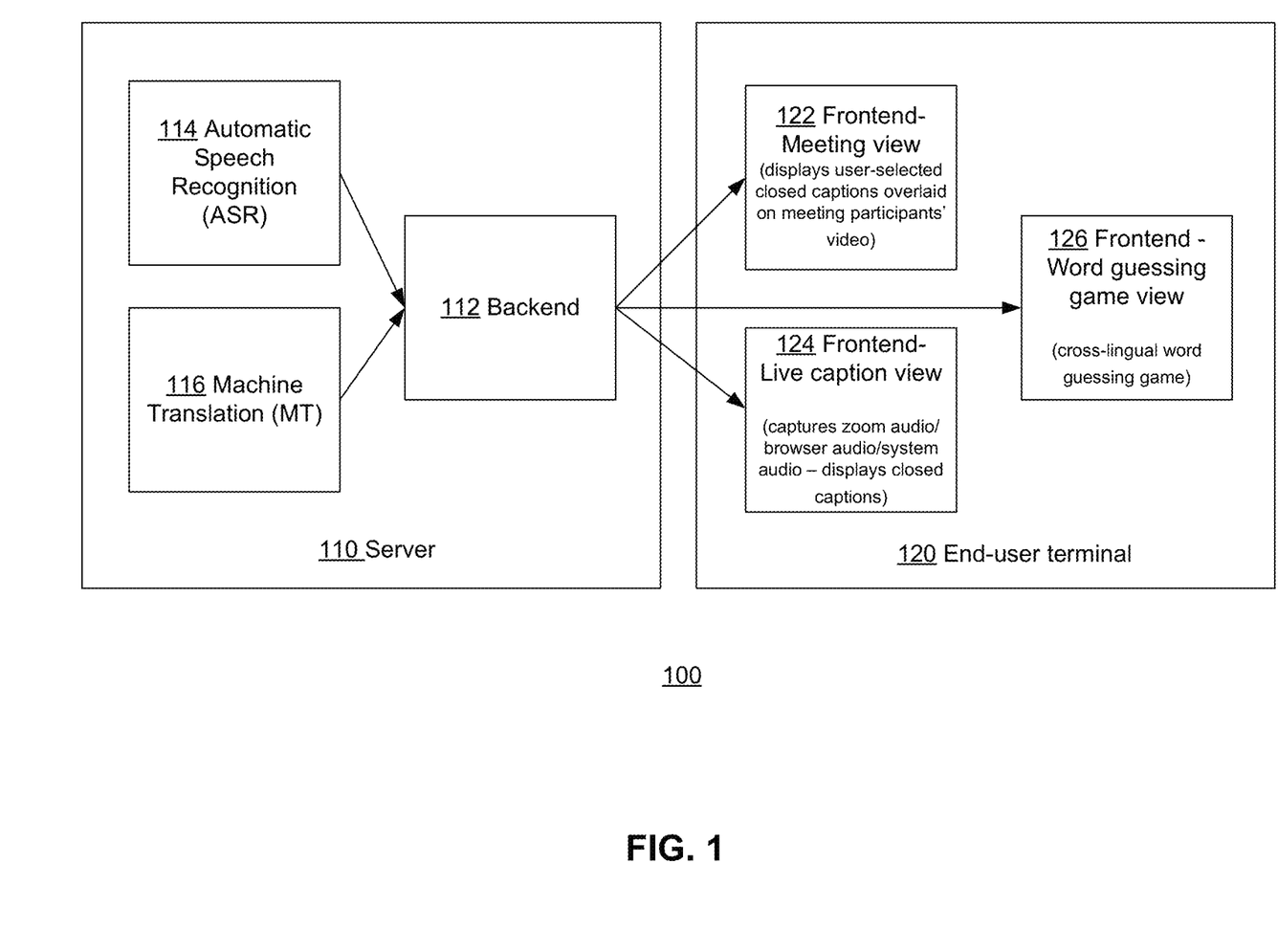
FIG. 1 illustrates an exemplary live translation captioning system in accordance with various embodiments.

FIG. 1 illustrates an exemplary online video conferencing system 100 with live translation caption in accordance with various embodiments. The online video conferencing system 100 may include a server 110 side and an end-user terminal 120 side. It is to be understood that although two computing devices, i.e., the server 110 and the end-user terminal 120, are shown in FIG. 1, any number of computing devices may be included in the system 100.

In some embodiments, the system 100 may support verbal communications among multiple participants speaking different languages. For example, in a video conference, the system 100 may receive audio input from speaker A speaking Spanish, transcribe the audio input into text in Spanish, and translate the Spanish text into English and display the English text for speaker B speaking English. Then the system 100 may receive another audio input from speaker B responding in English, transcribe the audio input into text in English, and translate the English text into Spanish and display the Spanish text back to speaker A. Here, the "video conference" does not require any user to turn on their cameras or to share their images, instead, it merely needs a given user to have a user interface for displaying the live translation captions. The user interface may include a video display (e.g., displaying the live translation captions as text), an audio display (e.g., playing the live translation captions in audio). In other embodiments, the system 100 may also be used to provide live translation captions for audio inputs from other sources, such as movies, speeches, news reports, face-to-face communications between multiple peoples speaking different languages, or other natural language sources.

In some embodiments, the server 110 and the end-user terminal 120 may be implemented in one or more networks (e.g., enterprise networks), one or more endpoints, or one or more clouds. The server 110 may include hardware or software which manages access to a centralized resource or service in a network or a cloud.

The end-user terminal 120 may refer to a web-based interface, a mobile application-based interface, or any other form of user interface connecting users with the server 110. The end-user terminal 120 may be implemented on or as various devices such as a mobile phone, tablet, server, desktop computer, laptop computer, etc. The end-user terminal 120 may each be associated with one or more vehicles (e.g., car, truck, boat, train, autonomous vehicle, electric scooter, electric bike, etc.). The server 110 and the end-user terminal 120 may each be implemented as an in-vehicle computer or as a mobile phone used in association with the one or more vehicles. The server 110 and the end-user terminal 120 may communicate with each other over the internet, through a local network (e.g., LAN), or through direct communication (e.g., BLUETOOTH™, radio frequency, infrared).

In some embodiments, the server 110 may include a backend interface 112 handling data communications with the end-user terminal 120. For example, the end-user terminal 120 may input audio sequences into the server 110 by triggering corresponding Application Programming Interfaces (APIs) in the backend interface 112. The backend interface 112 may then redirect the input to proper components for audio to text conversion and subsequent machine translation, and then feed the output text back to the end-user terminal for displaying to the users. In some embodiments, the backend interface 112 may be implemented as a Flask server.

In some embodiments, the server 110 may further include an automatic speech recognition (ASR) subsystem 114 and a machine translation (MT) subsystem 116 for transcribing the input audio sequences into texts, and translating the texts into a target language, respectively. For example, the ASR 114 processes the incoming audio sequences in a streaming mode, transcribes it in the speaker's language (e.g., a first language) to be used as input to the MT 116 to decode in the listener's language (e.g., a second language) during a call. In some embodiments, the ASR 114 and MT 116 subsystems may be implemented as software modules, which allow the users to swap the AST 114 and MT 116 from different service providers (such as Google ASR or in-house ASR services).

In some embodiments, the end-user terminal 120 may implement various views for end-users, such as a meeting view 122, a live caption view 124, a word guessing game view 126, another suitable view, or any combination thereof. In some embodiments, the meeting view 122 may display closed captions in a user-selected language overlaid on the user's video. In some embodiments, the live caption view 124 may be configured to capture video conference audio, browser audio, system audio, or another form of audio input, and display closed captions in the user-selected language. In some embodiments, the word guessing game view 126 may refer to a cross-lingual word guessing game designed to provide an end-to-end performance evaluation suite to measure the performance of the system 100. More details regarding the word guessing game may refer to FIG. 3.

In some embodiments, the end-user terminal 120 may be implemented as a web-based user interface comprising a home page, a meeting creation page, a meeting landing page, and a meeting page. The home page allows a user to create a meeting room or a word-guessing game with default settings. The meeting creation page allows the user to configure the meeting settings, which include a number of maximum participants, the ASR subsystem selected from a list of ASR candidates, the MT subsystem selected from a list of MT candidates, post-translation settings such as Mask-K (hide the last K words) and translate-K (translate every K new words), captioning settings such as a number of lines for displaying and displaying methods (word-level sliding, line-level scrolling, skype-style, etc.), and other suitable settings.

The pipeline in the server 110 may have a tight latency requirement in order to provide decent quality captions in a live situation such as conference calls. In some embodiments, the system may implement various features to enable a better user experience and reduce the cognitive load on the participants, such as smooth-pixel-wise scrolling of the captions, fading text that is likely to change, and biased decoding of machine translation output to reduce flickers of the captions. For example, the system 110 may implement translate-K method by sending every k-th ASR output to MT, which may result in captions that are more stable but updated slowly. Note that the contiguous outputs from ASR may have overlaps with new words appended or changed, sending every k-th ASR output to MT allows the MT to receive a relatively stabilized output from ASR. As another example, the system 110 may implement a translate-t method by sending an ASR output to MT if at least t seconds have elapsed since the last MT call (e.g., t seconds since the most recent output of the ASR subsystem was fed into the MT subsystem). The system 110 may also implement mask-k method by suppressing the last k words from the MT output, providing time for the translation to settle down. The system 110 may further preserve line breaks by preventing words from humping back and forth across line breaks.

Figure 2:
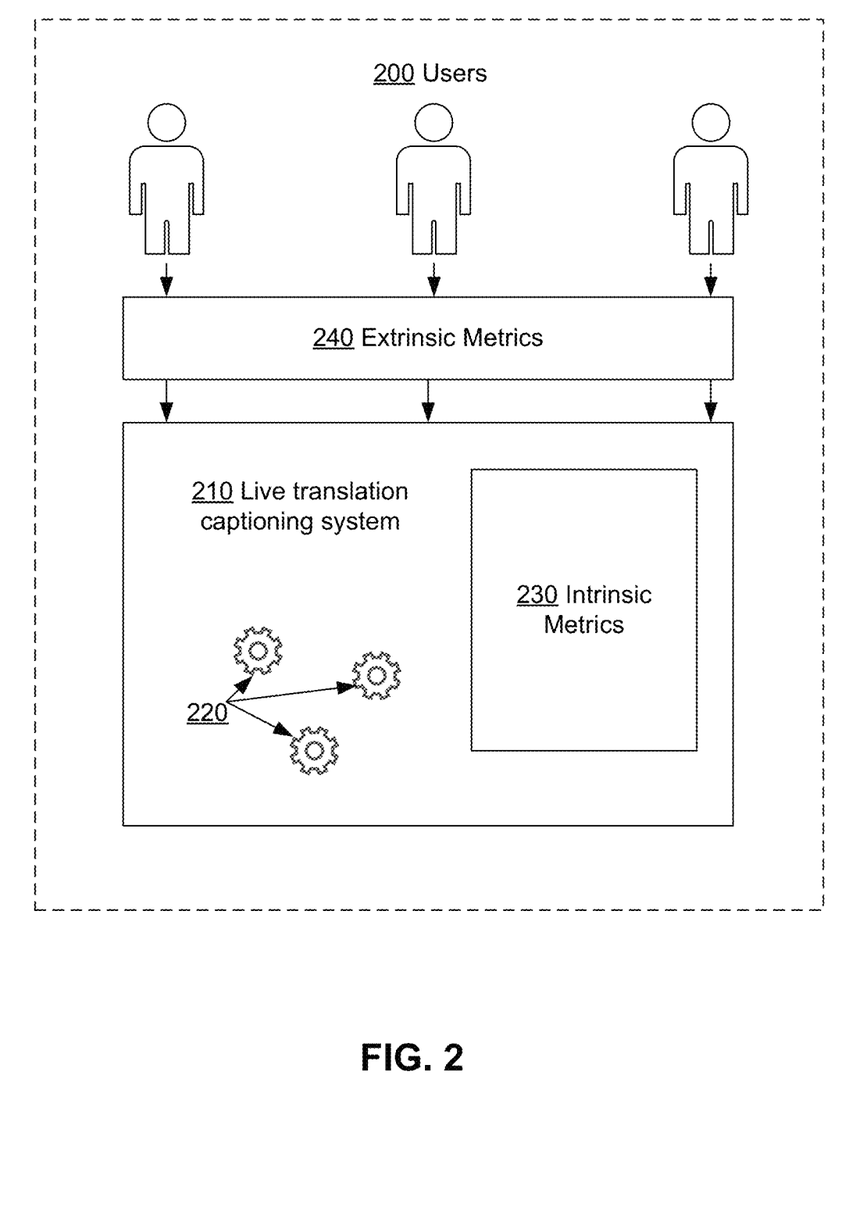
FIG. 2 illustrates an exemplary diagram of measuring performance of a live translation captioning system in accordance with various embodiments.

FIG. 2 illustrates an exemplary diagram of measuring the performance of a live translation captioning system 210 in accordance with various embodiments. The live translation captioning system 210 or another form of communication system requiring living translation may have numerous settings 220 that may affect system performance and user experience. These settings 220 are usually associated with trade-offs. For example, different types of ASR subsystems from different vendors may have their advantages in specific areas, one way of displaying the live translation captions may have fewer flickers but higher translation lags than another way, etc. For a given group of users 200, how to identify the optimal setting combination of the live translation captioning system 210 to provide the best performance (objectively and/or subjectively) is critical and challenging.

At a high level, there are two ways to measure the performance of the live translation captioning system 210: based on intrinsic metrics 230 and based on extrinsic metrics 240. The intrinsic metrics 230 refer to measurable system performance statistics. For example, BLEU (BiLingual Evaluation Understudy) is a metric for automatically evaluating machine-translated text. The BLEU score is a number between zero and one that measures the similarity of the machine-translated text to a set of high-quality reference translations. Anti-flicker devices and methods that "lock-in" partial translation generally decrease the BLEU score of the translation. As another example, translation lag may be used to measure the average difference, in seconds, between when a word was spoken and when its translation is finalized on the screen. Normalized erasure may be used to quantify flicker by using a m/n ratio between the number of words m that get erased during the production of an n-word utterance. In some embodiments, it is valuable to generate translation captions immediately after a speaker begins, even if the initial translation involves some flicker. In these cases, initial lag may be used to measure the time between initial speaking time and the first displayed word. The initial lag metric may be improved by adopting a Mask-0 policy (i.e., displaying the MT output without suppressing) at the start of an utterance, which is transitioned to Mask-k (e.g., k=4, suppressing the last k words from the MT output) policy later. Incremental caption lag may be used to measure the average time between caption updates. Mean/Max word burstiness may refer to the mean or maximum number of words or characters that are added/subtracted in a single caption update.

The above-mentioned intrinsic metrics 230 may directly show system statistics. However, there are several practical issues with intrinsic metrics 230. First, some intrinsic metrics 230 can only be measured offline. For example, the accuracy metrics (e.g., word errors, BLEU) require comparison with reference translations, which may not be readily available during the online services. Second, individual intrinsic metrics 230 may not reveal the user experience in a comprehensive way. For example, fewer flickers usually lead to a better user experience because the captions are more stable. However, to reduce flickers, the captions may not be updated timely to provide a more accurate translation, which may negatively impact the user experience. To address these issues, extrinsic metrics 240 may be used to directly measure user experience in exploring the optimal combination of system settings.

As shown in FIG. 2, the extrinsic metrics 240 may directly and comprehensively evaluate the user experience of the users 200 when using the live translation captioning system 210. For example, for each combination of settings of the live translation captioning system 210, a set of extrinsic metrics 240 may be collected. In some embodiments, the extrinsic metrics may be represented in the form of scores. The combination of settings that achieves the highest score may be determined as optimal settings of the live translation captioning system 210.

Figure 3:
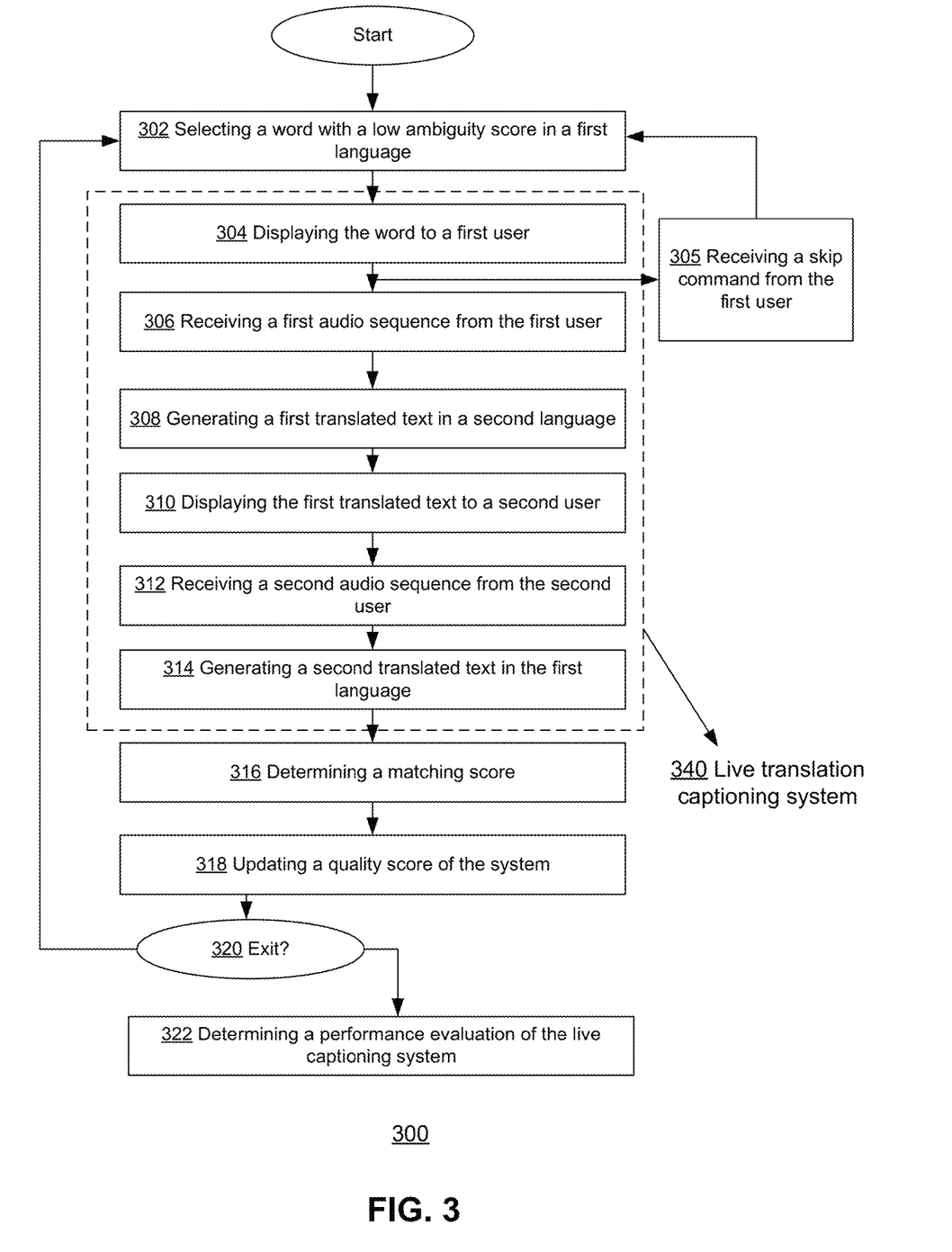
FIG. 3 illustrates an exemplary method for measuring performance of a live translation captioning system in accordance with various embodiments.

FIG. 3 illustrates an exemplary method 300 for measuring the performance of a live translation captioning system in accordance with various embodiments. The method 300 in FIG. 3 is for illustrative purposes and may include fewer, more, or alternative steps depending on the implementation. The method 300 may be referred to as a cross-lingual, cooperative word game for A/B testing different system settings of a live captioning system 340. The word game may be played by multiple players who speak different languages using the live translation captioning system 340 to communicate with each other. If the players obtain higher scores under one specific system setting, it may be determined that their communication is, in some way, made more effective and efficient by using the specific system setting.

As shown in FIG. 3, the method 300 may start with selecting a word with a low ambiguity score in a first language at step 302. In some embodiments, the word may be selected based on ambiguity scores of a plurality of word candidates. The ambiguity scores of the word candidates may be determined by: feeding each of the plurality of word candidates into an online dictionary to obtain returned entries; and determining an ambiguity score of the word based on a number of returned entries. For example, the word "case" may be fed into the online dictionary and receive numerous explanations (e.g., entries), while "giraffe" may receive one specific explanation. In some embodiments, natural language processing techniques may be used to determine the number of "explanations" for each word.

At step 304, the selected word may be displayed to a first user speaking the first language. The first user may then verbally describe the word without mentioning the word or variant of it. The verbal description may be input into an audio receiving device associated with the living captioning system 340, such as a microphone of the first user.

At step 306, the verbal description from the first user in the first language, denoted as a first audio sequence, may be received by the live translation captioning system 340.

At step 308, the first audio sequence may be fed into a natural language processing (NLP) pipeline for audio-to-text conversion and text-to-text translation. In some embodiments, the NLP pipeline includes one or more Automatic Speech Recognition (ASR) subsystems and one or more machine translation (MT) subsystems. For example, the ASR subsystem may transcribe every new extended source sentence in the first language as the speaker speaks, with the ability to modify previously displayed/generated captions when new ASR output is available. The output of the ASR subsystem may be fed into the MT subsystem for translation from the first language into a second language.

In some embodiments, the backend services of ASR and MT subsystems are joined in a cascaded manner. A participant's speech in a first language is fed in a streaming fashion to the ASR subsystem of the appropriate language selected by the participant. In some embodiments, the ASR output (e.g., in the first language) may be displayed to the speaker as feedback or confirmation, while the MT output (e.g., in a second language) may be displayed to a reader (e.g., the other participant). Each of the transcribed text returned by the ASR subsystem may be fed to the MT subsystem to translate it into the caption language selected by the reader. Since the ASR subsystem continually returns a revised or an extended string, the input to the MT subsystem is noisy and will lead to the captions overwritten frequently (termed as flicker) leading to a high cognitive load on the reading. In some embodiments, several techniques may be employed to reduce the flickering and provide a better user experience. For example, the input to the ASR subsystem may include a plurality of audio segments that is being streamed into the ASR subsystem. For each of the plurality of audio segments, the ASR subsystem may generate an output including a revised or an extended string to be fed into the MT system. During this process, the live translation captioning system 340 may implement translate-K method by sending every k-th ASR output to MT, which may result in captions that are more stable but updated slowly. Note that the contiguous outputs from ASR may have overlaps with new words appended or changed, sending every k-th ASR output to MT allows the MT to receive a relatively stabilized output from ASR. As another example, the live translation captioning system 340 may implement a translate-t method by sending an ASR output to MT if at least t seconds have elapsed since the last MT call (e.g., t seconds since last output was fed into the MT subsystem). The live translation captioning system 340 may also implement mask-k method by suppressing the last k words from the MT output, providing time for the translation to settle down. The live translation captioning system 340 may further preserve line breaks by preventing words from humping back and forth across line breaks.

In some embodiments, the ASR subsystem may include a single sequence-to-sequence ASR model trained based on a joint set of corpora from a plurality of languages, or a plurality of ASR models respectively trained based on training samples from a plurality of languages. In some embodiments, the MT subsystem may include a single multilingual neural machine translation model trained based on a joint set of corpora from a plurality of languages, or a plurality of MT models respectively trained based on training samples from a plurality of languages.

The output generated by the MT subsystem may be denoted as a first translated text in the second language selected by a second user (e.g., a reader or listener communicating with the speaker). At step 310, the first translated text may be displayed to the second user.

In response to the displayed first translated text, at step 312, the second user may speak in the second language to respond to the first user. This way, the live captioning system 340 may receive a second audio sequence from the second user.

At step 314, the second audio sequence may be fed into the pipeline of ASR and MT subsystems to generate a second translated text in the first language.

At step 316, the second translated text may be compared with the selected word to determine a matching score. In some embodiments, NLP techniques may be deployed to extract features from the second translated text and the selected word by using bag-of-words, TF-IDF, or word2vec. The extracted features may then be embedded to generate vector representations of the second translated text and the selected word, respectively. The matching score between the second translated text and the selected word may be determined based on a distance between the vector representations, e.g., by using cosine similarity, Euclidean distance, Jaccard distance, or word mover's distance. The preference of such matching scores over literal matching is to allow the reduce false negatives when the second translated text and the selected word are synonyms. More important, different languages may have different words for the same thing. For example, At step 318, a quality score of the live captioning system 340 with current settings may be updated based on the matching score. If the matching score is greater than a threshold, it indicates that the participants were able to communicate effectively and efficiently using different languages, and thus the quality score of the live captioning system 340 with current settings may be increased. In some embodiments, the update of the score may be simply a fixed-point increase. In other embodiments, the update of the quality score may include a score adjustment determined inversely proportional to the time spent between step 304 and step 314. For example, a shorter time duration may indicate a higher communication effectiveness and a better user experience, thus corresponds to a higher score adjustment. In some embodiments, the time spent between step 304 and step 314 may be mapped into one of a plurality of score adjustment tiers, each score adjustment tier corresponding to a time range. Based on the mappings, the score adjustment may be determined and then applied to a current quality score of the live captioning system 340 with current settings.

At step 320, the method 300 may exit if an exit condition is met. The exit condition may include a time limit, a number of words limit, or another suitable limit. If the exit condition is not met, the method 300 continues from step 302.

At step 322, after the method 300 exits, the overall score of the live translation captioning system 340 may be used as extrinsic metrics in evaluating the performance of the system 340.

In some embodiments, the method 300 may provide an option for the first user to skip a word at step 305.

As shown in FIG. 3, steps 304-314 may be performed by the live translation captioning system 340, and other steps may be implemented in a software wrapper (such as an online gaming system) encompassing the live translation captioning system 340, a plug-in of the live translation captioning system 340, or an web-based or mobile application-based interface interacting with the live translation captioning system 340.

In order to accurately quantify the end-to-end user experience (also called the quality score) of the live translation captioning system 340, any human related delays and errors must be minimized. For example, the matching score determination at step 316 relies on NLP techniques to achieve the optimal accuracy with minimum human interactions to minimize human errors and biases. Furthermore, the method 300 requires real-time matching score determination at step 316 and real-time quality score update at step 318 to accurately determining the quality score. As a result, all steps between 304 and 318 must be performed by a computer system rather than human beings to avoid human delays. For instance, the method 300 involves using ASR and MT for transcribing and translating audio signals in a first language into text in a second language, determining similarity scores using NLP, and determining score adjustments based on a mapping function with the time spent between 304-314 as input.

Figure 4:
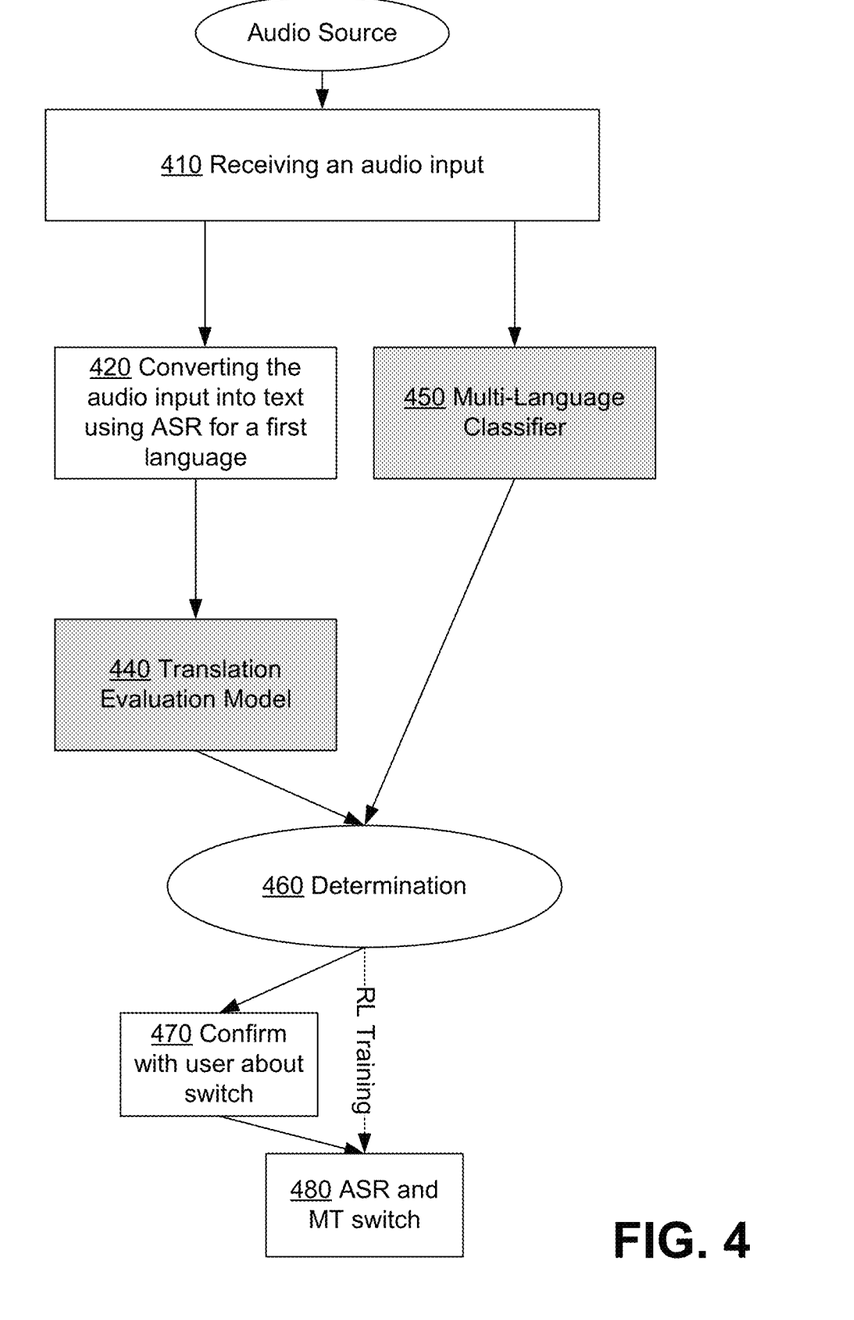
FIG. 4 illustrates an exemplary diagram for automatic language identification in a live translation captioning system in accordance with various embodiments.

FIG. 4 illustrates an exemplary diagram for automatic language identification (ALI) in a live translation captioning system in accordance with various embodiments. As described above, a live translation captioning system allows users to select their own languages so that a first user may speak his/her own language while the system translates the first user's speech into other languages for other users. Ideally, once a user selects his/her own language, the system will assume the user will speak the same language throughout the session (e.g., a conference or a meeting). However, this usually is not the case during a multi-lingual online conference. A user may start with a first language and then switch to a second language for a short period of time before switching back to the first language. For example, a user may first speak Chinese to clients and then ask a colleague a question in English before talking to the client in Chinese again. These short-term language switches impose challenges for live translation captioning systems. For example, after the user initially selects his/her own language, the live translation caption system may assign corresponding ASR and MT pipeline to transcribe and translate the user's audio input. The unexpected language switch from the user may cause the ASR and MT pipeline to generate non-sense outputs and other users may not get any useful translation.

The existing solutions to detect a user's language switch are usually manual and require the user to take action, such as clicking a button or selecting an option to notify the system about the new language. However, in practice, users often forget or simply ignore the request for action, which makes these manual solutions ineffective.

The method illustrated in FIG. 4 describes a technical implementation of an ALI subsystem. In some embodiments, the ALI subsystem includes two machine learning models: an audio-based multi-language classifier 450 and a text-based translation evaluation model 440.

In some embodiments, the audio-based multi-language classifier 450 may be trained based on a plurality of labeled audio clips in a plurality of languages. The classifier 450 may be trained to score an input audio clip with a plurality of probabilities corresponding to the plurality of languages. For instance, an output of English (22%), Chinese (55%), Spanish (4%), and Portuguese (19%) indicates that the language in the input audio clip is more likely Chinese than other languages. In some embodiments, the audio-based multi-language classifier 450 may be implemented as a neural network. During training, spectrograms of the training audio clips are generated as input to train the neural network. The spectrograms of the training audio clips may include feature patterns associated with different languages. After training, the neural network may classify the spoken language based on the spectrogram of the audio input.

In some embodiments, the text-based translation evaluation model 440 may be trained to evaluate the quality of a translated text. For example, when a user suddenly switches from English to Chinese, the ASR and MT pipeline may still be configured for transcribing and translating English audio signals and thus generate some non-sense text output. The translation evaluation model 440 may be trained to quantify the quality of the text output generated by the ASR and MT pipeline. In some embodiments, the translation evaluation model 440 may be implemented using Bidirectional Encoder Representations from Transformers (BERT), syntax analysis compilers, or other suitable grammar checking models. Given a translation (e.g., text output of the ASR and MT pipeline), the translation evaluation model 440 may generate a quality score for the translation. A non-sense text output (translation in a wrong language) may have a low-quality score.

Referring back to FIG. 4, after the audio receiver receives an audio input in a first language from the source at step 410 (e.g., a speaker speaking the first language), it feeds the audio input into two branches: a text branch and an audio branch.

As shown, the audio input may be fed into the ASR and MT pipeline at step 420 to transcribe the audio input into text. When the ASR and MT pipeline presumes that the audio input is in a first language, the text generated by the ASR subsystem in the pipeline may be also in the first language. This generated text may then be fed into the translation evaluation model at step 440 to evaluate the quality of the translation by generating a quality score.

In parallel, the audio input may be fed into the multi-language classifier 450 to determine a plurality of probabilities, each representing a likelihood that the language in the audio input is one of a plurality of languages.

At step 460, the quality score from the translation evaluation model 440 and the plurality of probabilities from the multi-language classifier 450 may be used to determine (1) whether the user switched to a new language in the audio input, and (2) if so, what the new language is. There are various ways to implement the determination. For example, if the quality score is lower than a threshold and the highest probability in the plurality of probabilities corresponds to a language that is different from the current language, it may be determined that the user has switched to a new language, and the new language is the one corresponding to the highest probability. As another example, if the highest probability in the plurality of probabilities is higher than a threshold (e.g., 95%) and corresponds to a new language that is different from the current language, it may be determined that the user has switched to the new language even if the quality score is high (e.g., the translation is in good quality).

In some embodiments, the determination at step 460 may be trained as another machine learning model, such as a decision tree, to determine whether the user has switched to a new language. In some embodiments, the training of the decision tree may be based on the user responses to the previous decisions made by the decision tree.

For example, if the decision tree determines that the user has switched to a new language, it may first prompt a window at step 470 asking the user to confirm the switch. If the user confirms the switch, the quality score from the translation evaluation model 440, the plurality of probabilities from the multi-language classifier 450, and the correct decision may be collected as a positive sample.

In some embodiments, the determination at step 460 may be implemented by Reinforcement Learning (RL), which trains/learns an action policy based on the previously determined switches and the users' responses confirming or disproving the switches.

In some embodiments, if the model used at step 460 reaches a high accuracy percentage that is greater than a threshold, the live translation captioning system may directly react to the determined switch at step 480 without generating the prompt windows for the users to confirm or disprove.

In some embodiments, after confirming that a user has switched to a new language, the live translation captioning system may reconfigure its ASR and MT pipeline to support the new language. For example, it may disable the ASR and MT pipeline for the previous language, and enable the ASR and MT pipeline for the new language to serve incoming audio signals.

Figure 5:
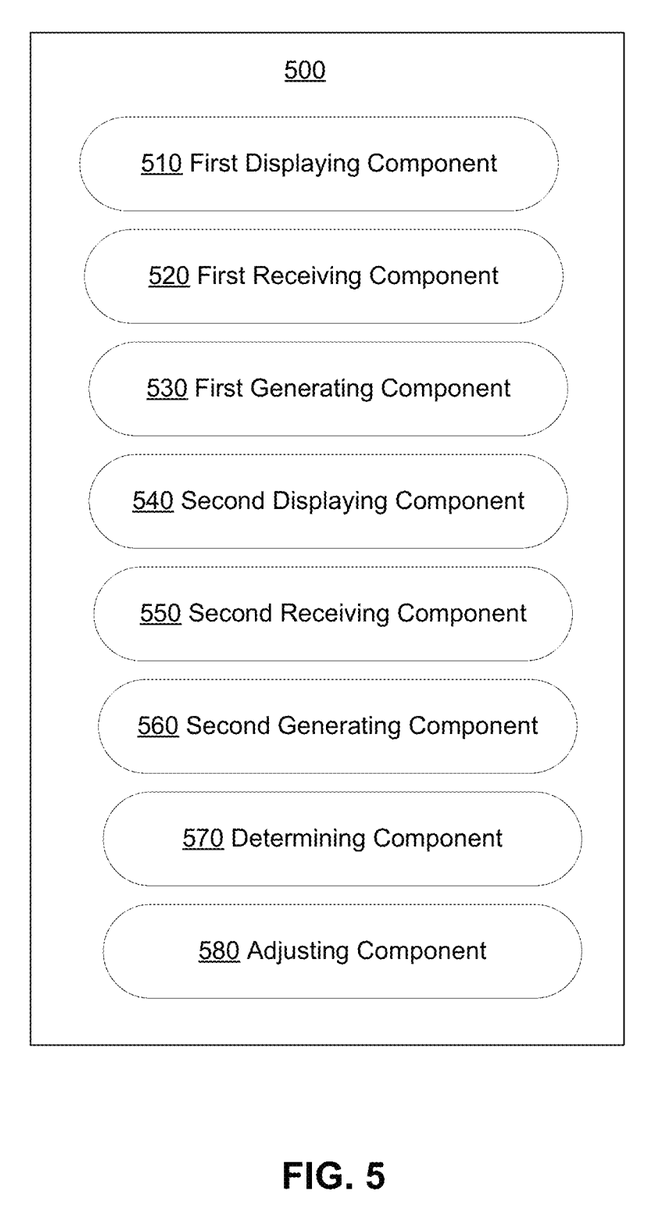
FIG. 5 illustrates an exemplary computer apparatus for measuring performance of a live translation captioning system in accordance with various embodiments.

FIG. 5 illustrates an exemplary computer apparatus 500 for measuring performance of a live translation captioning system in accordance with various embodiments. The computer apparatus 500 is for illustrative purposes and may include fewer, more, or alternative components. The computer apparatus 500 may implement the method 300 described in FIG. 3 and the flow diagram described in FIG. 4.

In some embodiments, the computer apparatus 500 may include a first displaying component 510, a first receiving component 520, a first generating component 530, a second displaying component 540, a second receiving component 550, a second generating component 560, a determining component 570, and an adjusting component 580.

In some embodiments, the first displaying component 510 may be configured to display a word in a first language on a first user interface; the first receiving component 520 may be configured to receive a first audio sequence, the first audio sequence comprising a verbal description of the word in the first language; the first generating component 530 may be configured to generate a first translated text in a second language by feeding the first audio sequence into a pipeline comprising an Automatic Speech Recognition (ASR) subsystem and a machine translation (MT) subsystem; the second displaying component 540 may be configured to display the first translated text on a second user interface; the second receiving component 550 may be configured to receive a second audio sequence, the second audio sequence comprising a guessed word based on the first translated text; the second generating component 560 may be configured to generate a second translated text in the first language by feeding the second audio sequence into the pipeline; the determining component 570 may be configured to determine a matching score between the word and the second translated text; and the adjusting component 580 may be configured to determine a performance score of the live translation captioning system based on the matching score.

Figure 6:
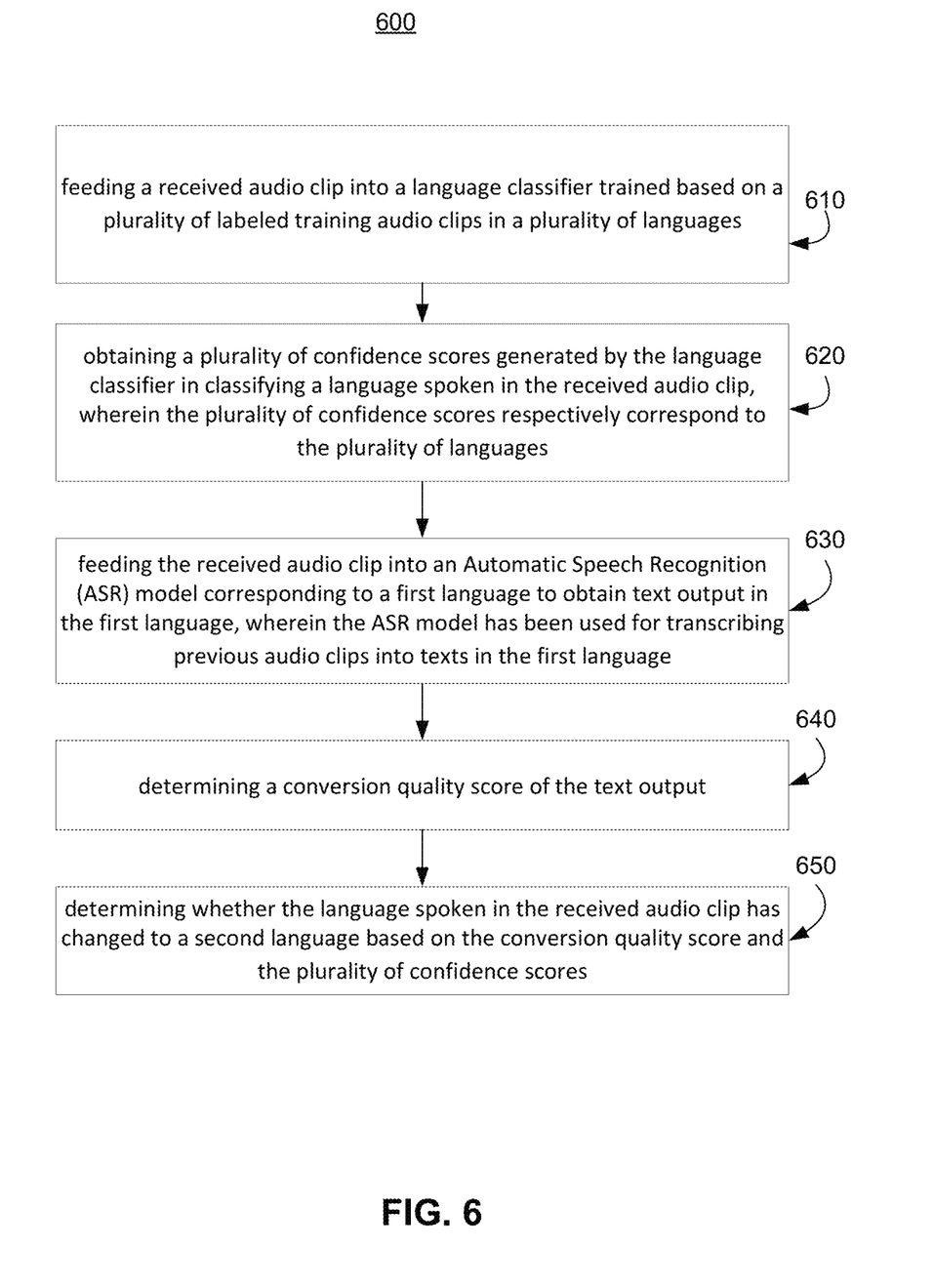
FIG. 6 illustrates another exemplary method for automatic language identification (ALI) in a live translation captioning system in accordance with various embodiments.

FIG. 6 illustrates another exemplary method 600 for automatic language identification (ALI) in a live translation captioning system in accordance with various embodiments. The method 600 may be implemented in an environment shown in FIG. 1. The method 600 may be performed by a device, apparatus, or system illustrated by FIGS. 1-5, such as system 210. Depending on the implementation, the method 600 may include additional, fewer, or alternative steps performed in various orders or parallel.

Block 610 includes feeding a received audio clip into a language classifier trained based on a plurality of labeled training audio clips in a plurality of languages.

Block 620 includes obtaining a plurality of confidence scores generated by the language classifier in classifying a language spoken in the received audio clip, wherein the plurality of confidence scores respectively correspond to the plurality of languages.

Block 630 includes feeding the received audio clip into an Automatic Speech Recognition (ASR) model corresponding to a first language to obtain text output in the first language, wherein the ASR model has been used for transcribing previous audio clips into texts in the first language.

Block 640 includes determining a conversion quality score of the text output. In some embodiments, the determining the conversion quality score of the text output comprises: determining the conversion quality score by using a Bidirectional Encoder Representations from Transformer (BERT).

Block 650 includes determining whether the language spoken in the received audio clip has changed to a second language based on the conversion quality score and the plurality of confidence scores. In some embodiments, determining whether the language spoken in the received audio clip has changed to the second language comprises: if the conversion quality score of the text output is below a threshold: identifying the second language corresponding to a highest confidence score from the plurality of confidence scores; and determining the language spoken in the received audio clip has changed to the second language.

In some embodiments, the method 600 may further include displaying a prompt window for a user to confirm whether the language spoken in the received audio clip has changed to the second language; in response to the user confirming of language change, disabling the ASR model corresponding to the first language and enabling an ASR model corresponding to the second language for transcribing new audio clips.

In some embodiments, the method 600 may further include in response to determining that the language spoken in the received audio clip has changed to the second language, disabling the ASR model corresponding to the first language and enabling an ASR model corresponding to the second language for transcribing the received audio clip.

Figure 7:
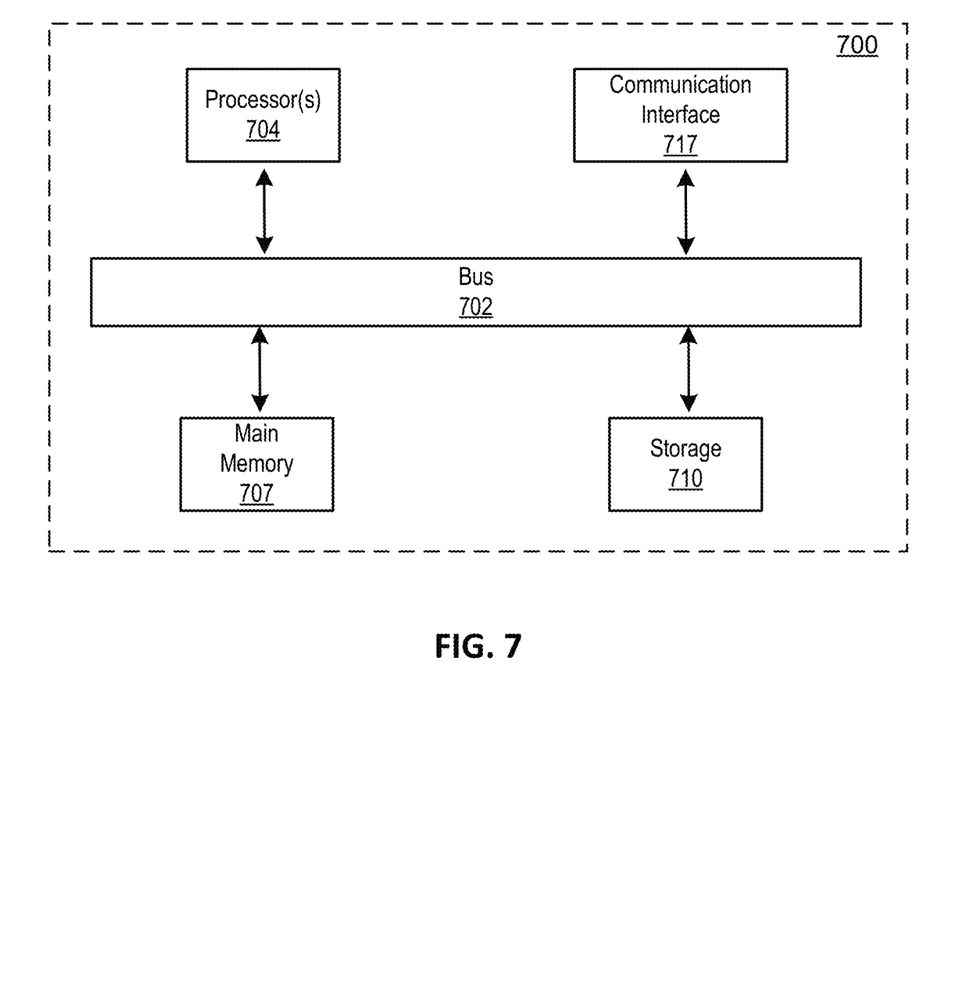
FIG. 7 is a block diagram that illustrates a computer system upon which any of the embodiments described herein may be implemented.

FIG. 7 is a block diagram that illustrates a computer system upon which any of the embodiments described herein may be implemented. The computing device may be used to implement one or more components of the systems and the methods shown in FIGS. 1-6. The computing device 700 may comprise a bus 702 or other communication mechanism for communicating information and one or more hardware processors 704 coupled with bus 702 for processing information. Hardware processor(s) 704 may be, for example, one or more general-purpose microprocessors.

The computing device 700 may also include a main memory 707, such as a random-access memory (RAM), cache and/or other dynamic storage devices 710, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to the processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, an EPROM, a FLASH-EPROM, NVRAM, any other memory chip or cartridge, or networked versions of the same.

The computing device 700 may implement the techniques described herein using customized hard-wired logic, one or more ASICs or FPGAs, firmware, and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 710. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 717 coupled to bus 702. Communication interface 717 may provide a two-way data communication coupling to one or more network links that are connected to one or more networks. As another example, communication interface 717 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform. The terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A method for evaluating performance of a live translation captioning system, comprising:
    displaying a word in a first language on a first user interface;
    receiving a first audio sequence, the first audio sequence comprising a verbal description of the word in the first language;
    generating a first translated text in a second language by feeding the first audio sequence into a pipeline comprising an Automatic Speech Recognition (ASR) subsystem and a machine translation (MT) subsystem;
    displaying the first translated text on a second user interface;
    receiving a second audio sequence, the second audio sequence comprising a guessed word based on the first translated text;
    generating a second translated text in the first language by feeding the second audio sequence into the pipeline;
    determining a matching score between the word and the second translated text;
    determining a performance score of the live translation captioning system based on the matching score.

2. The method of claim 1, wherein the generating the first translated text comprises:
    generating a first text sequence by feeding the first audio sequence into the ASR subsystem; and
    generating the first translated text in the second language by feeding the first text sequence into the MT subsystem corresponding to the second language.

3. The method of claim 2, wherein the first audio sequence comprises a plurality of audio segments, and the ASR subsystem is configured to generate an output when each of the plurality of audio segments is fed in.

4. The method of claim 3, wherein the feeding the first text sequence into the MT subsystem comprises:
    feeding every k-th output generated by the ASR subsystem into the MT subsystem, wherein k is a positive integer.

5. The method of claim 3, wherein the feeding the first text sequence into the MT subsystem comprises:
    feeding the output generated by the ASR subsystem into the MT subsystem if t seconds have elapsed since a most recent output of the ASR subsystem was fed into the MT subsystem, wherein t is a positive integer.

6. The method of claim 1, wherein the generating the second translated text comprises:
    generating a second text sequence by feeding the second audio sequence into the ASR subsystem; and
    generating the second translated text by feeding the second text sequence into the MT subsystem.

7. The method of claim 1, wherein the ASR subsystem comprises a sequence-to-sequence ASR model trained based on a joint set of corpora from a plurality of languages.

8. The method of claim 1, wherein the ASR subsystem comprises a plurality of ASR models respectively trained based on training samples from a plurality of languages.

9. The method of claim 1, wherein the MT subsystem comprises a multilingual neural machine translation model trained based on a joint set of corpora from a plurality of languages.

10. The method of claim 1, wherein the MT subsystem comprises a plurality of MT models respectively trained based on training samples from a plurality of languages.

11. The method of claim 1, wherein the method further comprises selecting the word from a plurality of word candidates in a first language based on ambiguity scores of the plurality of word candidates, wherein the ambiguity scores of the plurality of word candidates are determined by:
    feeding each of the plurality of word candidates into an online dictionary to obtain returned entries; and
    determining an ambiguity score of the word based on a number of returned entries.

12. The method of claim 1, wherein the receiving the first audio sequence comprises continuously receiving audio signals, and
    the generating the first translated text in the second language comprises streaming the continuous audio signals into the pipeline and obtaining a stream of translated phrases in the second language.

13. The method of claim 12, wherein the displaying the first translated text on the second user interface comprises a live captioning of the stream of translated phrases.

14. The method of claim 1, wherein the determining a performance score of the live translation captioning system based on the matching score comprises:
in response to the matching score being greater than a threshold, increasing a performance score of the live translation captioning system, wherein the increase is inversely proportional to a time spent between generating the first translated text and generating the second translated text.

15. A system for evaluating performance of a live translation captioning system, the system comprising:
one or more processors; and
a memory storing instructions that, when executed by the one or more processors, cause the system to perform:
displaying a word in a first language on a first user interface;
receiving a first audio sequence, the first audio sequence comprising a verbal description of the word in the first language;
generating a first translated text in a second language by feeding the first audio sequence into a pipeline comprising an Automatic Speech Recognition (ASR) subsystem and a machine translation (MT) subsystem;
displaying the first translated text on a second user interface;
receiving a second audio sequence, the second audio sequence comprising a guessed word based on the first translated text;
generating a second translated text in the first language by feeding the second audio sequence into the pipeline;
determining a matching score between the word and the second translated text;
determining a performance score of the live translation captioning system based on the matching score.

* * * * *